United States Patent [19]

Yaguchi

[11] Patent Number: 4,988,904
[45] Date of Patent: Jan. 29, 1991

[54] VOICE COIL MOTOR WITH AN ENCODER

[75] Inventor: Fumihiro Yaguchi, Maruko, Japan

[73] Assignee: Shinano Kenshi Kabushiki Kaisha, Nagano, Japan

[21] Appl. No.: 331,395

[22] Filed: Mar. 31, 1989

[30] Foreign Application Priority Data

Feb. 2, 1989 [JP] Japan ................................ 1-11522[U]

[51] Int. Cl.⁵ ...................... H02K 41/00; G11B 21/10
[52] U.S. Cl. ..................................... 310/12; 360/104; 369/43
[58] Field of Search .................. 310/12; 360/104, 105, 360/106, 107, 108, 109; 369/43

[56] References Cited

FOREIGN PATENT DOCUMENTS 0295015 12/1988 European Pat. Off. ............ 360/106

Primary Examiner—Steven L. Stephan
Assistant Examiner—Judson H. Jones

[57] ABSTRACT

The present invention relates to a voice coil motor with an encoder. In a voice coil motor whose rotor rotates in a prescribed angular width to a base, a rotary disc for encoding is attached to the fringe section of the rotor, and an encoder is provided on the base corresponding to the track of the rotary disc. Attaching the rotary disc to the fringe section of the rotor, the length of the track can be long, so that number of slits perforated on the rotary disc can be increased. Therefore, resolution of the angular position of the rotor can be high.

6 Claims, 5 Drawing Sheets

VOICE COIL MOTOR WITH AN ENCODER

FIELD OF THE INVENTION AND RELATED ART STATEMENT

The present invention relates to a voice coil motor with an encoder, and more particularly to a voice coil motor which is preferably used as an actuator for driving a head of a magnetic disk storage unit.

There is disclosed a voice coil motor as an actuator for driving a head of a magnetic disk storage unit in Japanese Utility Model Provisional Publication (Kokai) Gazette No. 64-12480. This voice coil motor has a rotor with a magnetic coil which can be rotated in a prescribed angular range between a pair of parmanent magnets whose magnetic poles are different each other. The head attached to the rotor is accessed on a magnetic disk with the rotation of the rotor. During the access, the voice coil motor is only used for driving the head. All positioning data of the head are written in the data area or the servo area of the disk.

However, a conventional voice coil motor has the following disadvantages. Because all positioning data of the head occupy a part of the memory area of the disk, the capacity of the memory area which the user can use will be decreased. Additionally the expense of writing the positioning data continually increases.

To solve the above stated disadvantages, a pulse motor or a brushless motor is provided with an encoder attached to its rotor shaft. Such an arrangement, however, is unsuitable for high speed access and high density memorization. It has also been proposed to attach an encoder to a voice coil motor but, in case of attaching a rotary disk for encoding to a rotor shaft, it is very difficult to manufacture and adjust the rotary disk with a high resolution, so that the proposed means is difficult to realize.

OBJECT AND SUMMARY OF THE INVENTION

The object of the present invention is to provide a voice coil motor with an encoder which has high resolution.

In the present invention, a voice coil motor has a rotary disk for encoding which is attached to a fringe section of the rotor which is the outermost position from the rotor shaft, and an encoder which is fixed on a base corresponding to the track of the rotary disk. With this structure, the track of the rotary disk can be long, so that resolution of the encoder can be high.

BRIEF DESCRIPTION OF THE DRAWINGS

The preferred embodiments of the present invention will now be described by way of example with reference to the accompanying drawings in which.

DETAILED DESCRIPTION OF PREFERRED EMBODIMENTS

Preferred embodimnts of the present invention will now be described with reference to attached drawings.

(First Embodiment)

Figure 1:
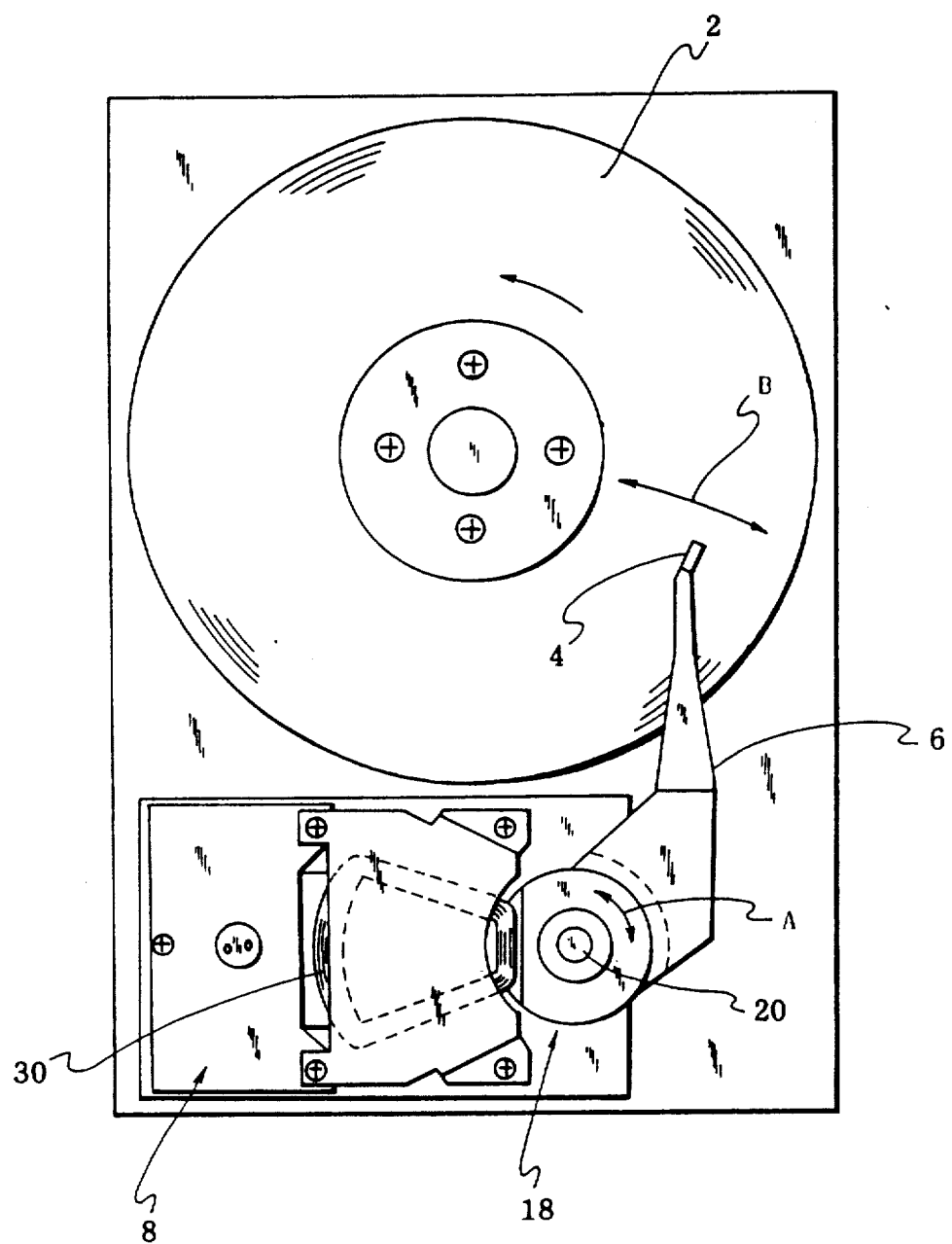
FIG. 1 shows a plan view of a magnetic disk storage unit having a voice coil motor with an encoder in a first embodiment as an actuator for driving a head.
Figure 2:
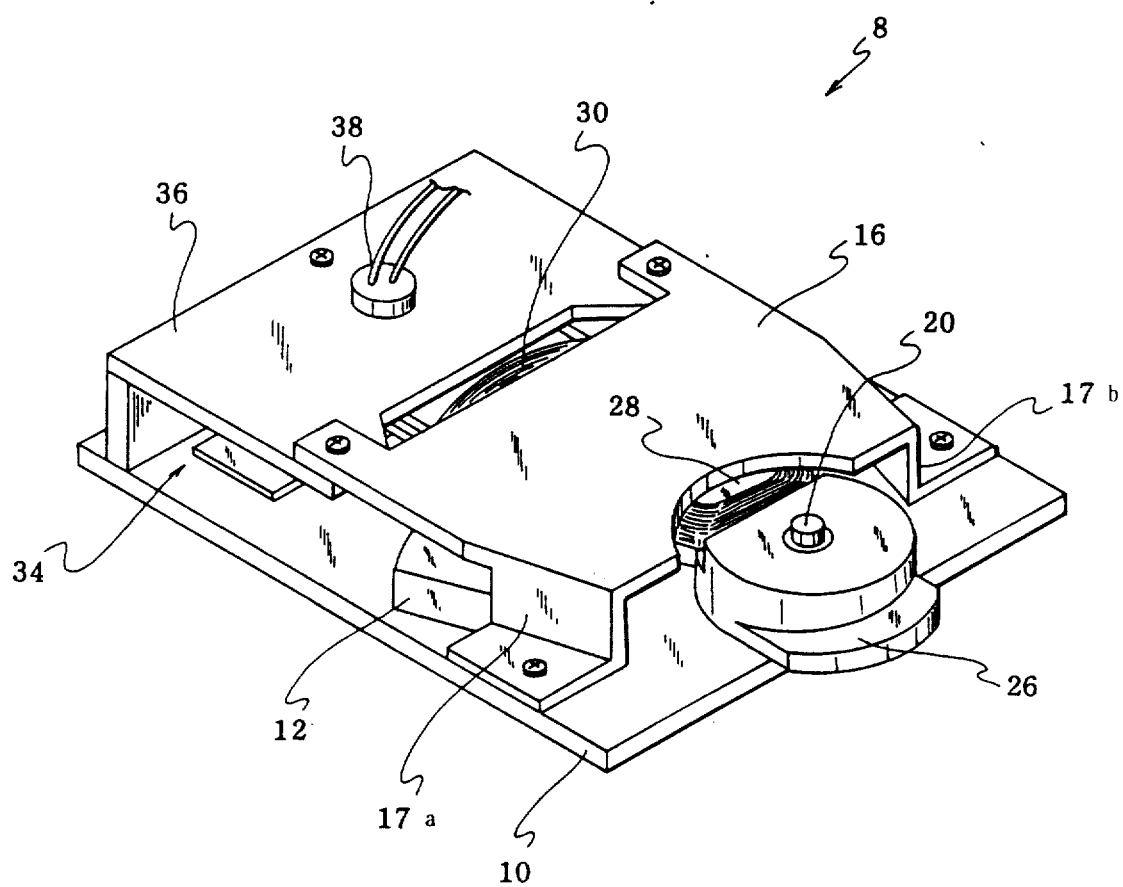
FIG. 2 shows a perspective view of the voice coil motor.
Figure 3:
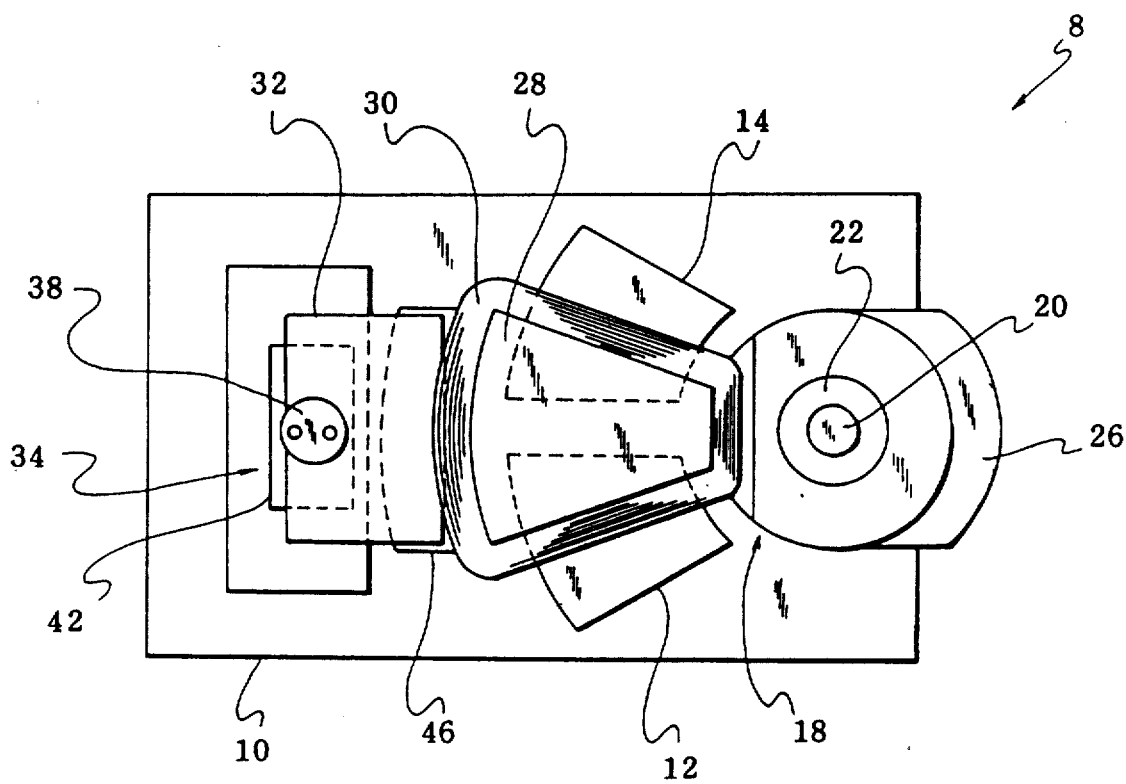
FIG. 3 shows a plan view of the voice coil motor with certain parts omitted.
Figure 4:
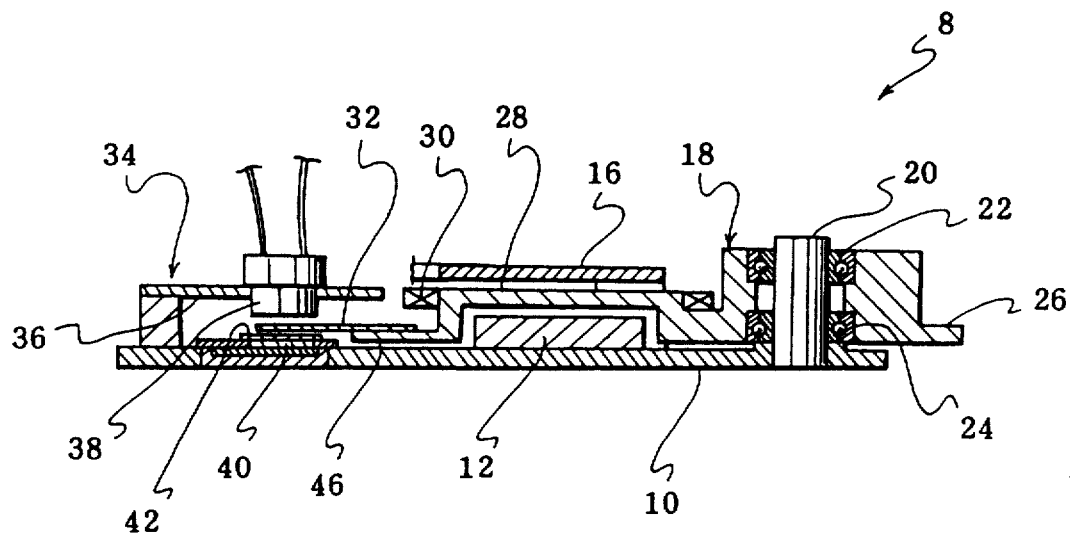
FIG. 4 shows a sectional view of the voice coil motor.

A magnetic disk storage unit is shown in FIG. 1. In the unit, data read from or written into a rotating disk 2 is executed by magnetic head 4. The head 4 is fixed to one end of an arm 6 whose other end is fixed to a rotor 18 of a voice coil motor 8 of this invention. The rotor 18 is rotated about a shaft 20 in direction indicated by an arrow A by controlling electric current passing through a coil 30 which is provided on the rotor 18. The head 4 can be moved on the disk 2 in a direction indicated by arrow B. Therefore, the position of the head 4 on the disk 2 can be controlled by controlling rotation angle of the rotor 18.

The voice coil motor 8 with an encoder will now be explained with reference to FIGS. 2-6.

Magnets 12 and 14, which are made of parmanent magnets, are arranged in a sector form on an upper face of a base 10. The upper face of the magnet 12 is the S pole; the upper face of the magnet 14 is N pole. Namely, magnetic poles of the upper faces of the magnets 12 and 14 are different each other. There is provided a yoke 16 (not shown in FIG. 3) over the magnets 12 and 14. The yoke 16 is made of magnetizable material and whose legs 17a and 17b are fixed on the upper face of the base 10. A magnetic circuit is closed via the magnets 12 and 14 and the yoke 16.

The rotor 18 is rotatably attached on the outer face of the shaft 20 which is vertically fixed on the base 10 with bearings 22 and 24. The rotor 18 is made of nonmagnetizable material. There is a head holder section 26 formed at the right side of the rotor 18. The arm 6, which is fixed to the head 4 at one end, is fixed at another end on the head holder section 26 by fixing means, such as vises, etc. A coil forming section 28 and a disk holder section 46 are formed in the extended section of the rotor 18 which is extended toward left side of the rotor 18. The coil forming section 28 is formed, as clearly shown in FIG. 4, to be an inverted U shape in section, and can be horizontally movable between the magnets 12 and 14 and the yoke 16. Therefore, the coil forming section 28 of the rotor 18 can be rotatable in a prescribed angular range (e.g. 20°) in which the rotor 18 is not restricted in its rotation by the legs 17a and 17b of the yoke 16.

The coil is formed by winding an electric wire around the outer face of the coil forming section 28. The rotor will be rotated by the magnetic power generated under the Fleming's left-hand rule when electric current is passed through the coil 30.

Figure 6:
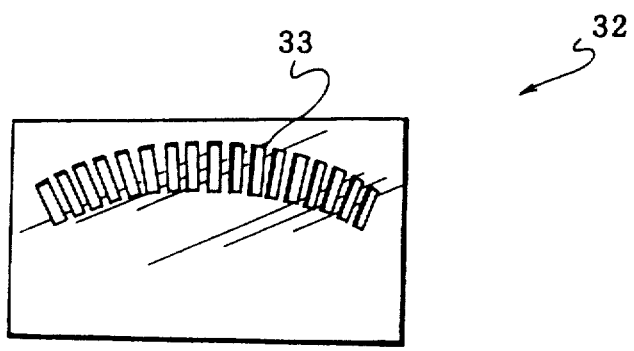
FIG. 6 shows a plan view of a rotary disk for encoding.

A plan view of a rotary disk 32 for encoding is shown in FIG. 6. A plurality of slits 33 are radially perforated on the rotary disk 32. The rotary disk 32 is fixed on the disk holder section 46 which is horizontally extended leftward from the lower end of the coil forming section 28. That is, it is important that the rotary disk 32 is provided at the outer fringe section of the rotor 18, at the furthest position from the shaft 20 of the rotor 18, so that the track of the rotary disk 32 can be long.

An encoder 34 includes a light emitting diode 38 fixed on a circuit board 36 and a light receiving diode 40 fixed on the base 10. The rotary disk 32 can be horizontally rotated between both of the diodes 38 and 40 with the rotation of the rotor 18. Both diodes 38 and 40 are arranged to face the track of the rotary disk 32. Note that a photo transistor can be used in place of the diode 40.

Figure 5:
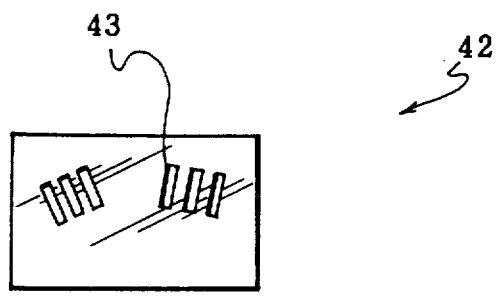
FIG. 5 shows a plan view of a mask of an encoder.

A plan view of a mask 42 is shown in FIG. 5. There are radially perforated slits 43 on the mask 42. The mask 42 is fixed on the light receiving diode 40.

Next, the action of the voice coil motor will now be explained.

When electric current passes through the coil 30, the rotor 18 is rotated about the shaft 20 by the magnetic power generated under Fleming's left-hand rule. Then, the rotary disk 32 is also horizontally rotated with the roter 18. The rotary disk 32 passes through both diodes 38 and 40 of the encoder 34. The light from the light emitting diode 38 reaches to the light receiving diode 40 via the slits 33 of the rotary disk 32 and the slits 43 of the mask 42, but the slits 33 move with the rotation of the rotary disk 32. Therefore, the quantity of light received by the light receiving diode 40 varies with the rotation of the rotary disk 32, so that the light receiving diode 40 generates signals as an approximate sine wave and is amplified in the circuit on the circuit board 36. The data of the present position of the head 4 can be gained by processing the signal amplified (e.g. number of pulse, voltage, etc.) with a position detecting circuit (not shown). A control circuit (not shown) generates positioning information of the head 4 to control the voice coil motor 8.

In the present invention, the rotary disk 32 is provided at the outer fringe section of the rotor 18, so that the length of the track of the rotary disk 32 can be longer. Therefore, the number of the slits 33 of the rotary disk 32 can be larger than conventional brushless motor having an encoder attached to a shaft of a rotor.

(Second Embodiment)

Figure 7:
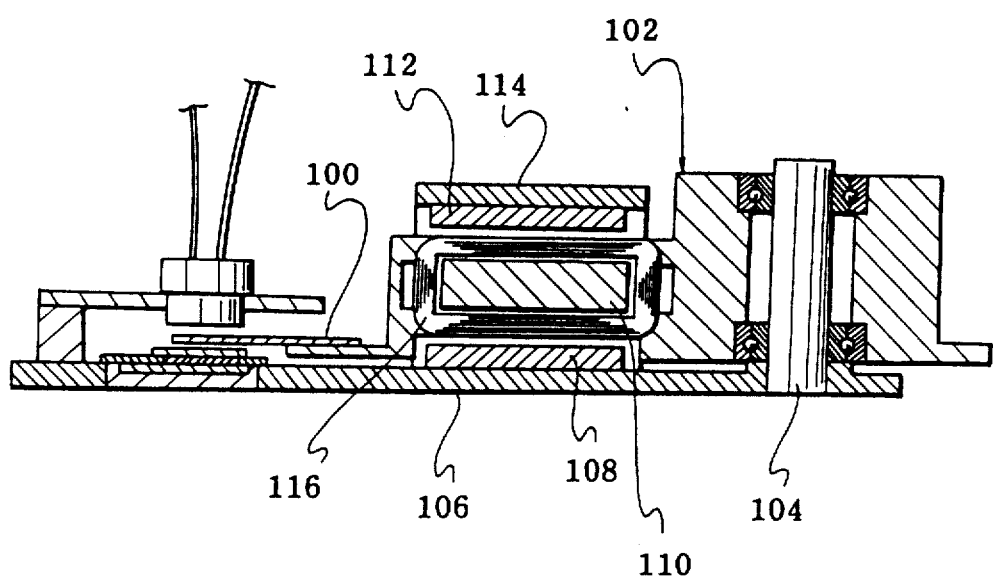
FIG. 7 shows a sectional view of a voice coil motor of a second embodiment.

Next, the second embodiment will now be explained with reference to FIG. 7.

A voice coil motor with an encoder is also attached a rotary disk 100 at the outer fringe section the outermost position from a shaft 104, of the rotor 102. In this embodiment, a magnet 112 is fixed on an inner upper wall of a yoke 114 which is made of magnetizable material and fixed on a base 106 and a magnet 108 is fixed on the base 106. Magnetic poles of the opposite faces of the magnets 108 and 112 are same.

A coil 116 formed on the rotor 102 can be horizontally passed through between the both magnets 108 and 112 with the rotation of the rotor 102. Note that, a horizontal yoke 110 is fixed at both ends thereof to the legs of the yoke 114, and the coil 116 is formed to cover the horizontal yoke 110.

The remaining structure and the action of the voice coil motor of this embodiment is the same as the first embodiment, so further with respect thereto is omitted for the sake of brevity.

In a conventional brushless motor with an encoder, a rotary disk is attached to a shaft of a rotor, so the encoder is piled up in the axial direction of the shaft. While in the present invention, the encoder is provided at the outermost position from the shaft of the rotor on the base because the rotary disk is attached at the outermost position from the shaft of the rotor. Therefore, the voice coil motor can be thin. As shown in both embodiments, the height of the encoder can be low by forming the disk holder section of the rotor close to the upper face of the base.

In the case of using the voice coil motor with an encoder as the actuator of the head of the magnetic disk storage unit, the ability to achieve high speed access and high density memorization is not restricted. Positioning data of the head written in the disk can be reduced, so that the cost to write the data can be sharply reduced and the user's memory area of the disk will not be limited. The rotary disk is attached to the position where its track can be the longest, so that the resolution of the encoder can be raised. Additionally, if high resolution is not required, the precision required for assembling the voice coil motor is not as great so that assembling efficiency can be increased.

Preferred embodiments have been described in detail, the present invention is not limited to the embodiments, many modifications are, of course, allowed without deviating the scope of the invention.

What is claimed is:

1. A voice coil motor with an encoder comprising:
   a base;
   permanent magnets substantially fixed on said base;
   a rotor rotatably provided on said base, said rotor having an outer fringe area;
   a coil formed by winding electric wire around a coil forming section of said rotor, said coil generating magnetic power to rotate said rotor when electric current passes therethrough;
   a rotary disk for encoding attached to a disk holder section which is provided at the outer fringe section of said rotor; and
   an encoder fixed on said base in a path of said rotary disk.

2. A voice coil motor with an encoder according to claim 1, wherein said coil forming section is provided between an axis of said rotor and said disk holder section, and said disk holder section is radially extended outward from said coil forming section.

3. A voice coil motor with an encoder according to claim 2, wherein said disk holder section is extended from a lower end of said coil forming section.

4. A voice coil motor with an encoder according to claim 1, wherein said disk holder section is radially extended outward from the lower end of said rotor.

5. A voice coil motor with an encoder according to claim 1, wherein a head holder section for attaching a magnetic head is formed on said rotor.

6. A voice coil motor with an encoder according to claim 1, further including a yoke made of magnetizable material, said yoke surrounding said coil to close a magnetic circuit between said permanent magnets.

* * * * *